United States Patent
Woods et al.

(10) Patent No.: US 7,287,789 B2
(45) Date of Patent: Oct. 30, 2007

(54) BREAK AWAY GRILLE

(75) Inventors: Scott L. Woods, Macomb, MI (US); Robert P. Magyarosi, Highland, MI (US)

(73) Assignee: Magna International Inc. (CA)

( * ) Notice: Subject to any disclaimer, the term of this patent is extended or adjusted under 35 U.S.C. 154(b) by 0 days.

(21) Appl. No.: 11/373,472

(22) Filed: Mar. 10, 2006

(65) Prior Publication Data

US 2007/0210591 A1  Sep. 13, 2007

(51) Int. Cl.
*B60R 19/52* (2006.01)
(52) U.S. Cl. ..................................... 293/115
(58) Field of Classification Search ............. 293/115; 296/193.1; 180/68.6
See application file for complete search history.

(56) References Cited

U.S. PATENT DOCUMENTS

| | | | | |
|---|---|---|---|---|
| 4,032,725 A | * | 6/1977 | McGee | 381/395 |
| 4,204,702 A | * | 5/1980 | Oltrogge | 280/491.5 |
| 4,471,991 A | * | 9/1984 | Matthias | 180/68.6 |
| 4,621,860 A | * | 11/1986 | Gerst | 296/91 |
| 4,842,319 A | * | 6/1989 | Ziegler et al. | 296/91 |
| 5,358,304 A | * | 10/1994 | Kanemitsu et al. | 296/193.09 |
| 5,915,490 A | * | 6/1999 | Wurfel | 180/68.1 |
| 6,113,164 A | * | 9/2000 | Setina | 293/115 |
| 6,318,773 B2 | * | 11/2001 | Storer | 293/115 |
| 6,872,345 B1 | * | 3/2005 | Yustick | 264/255 |
| 7,108,092 B2 | * | 9/2006 | Suwa et al. | 180/68.4 |
| 2006/0048459 A1 | * | 3/2006 | Moore | 52/79.1 |
| 2006/0086353 A1 | * | 4/2006 | Ransford | 126/37 B |

* cited by examiner

*Primary Examiner*—Kiran B. Patel
(74) *Attorney, Agent, or Firm*—Warn Partners, PC; Marc Luddy

(57) ABSTRACT

A break away vehicle grille assembly having a first piece with a locking flange and a second piece located generally adjacent the first piece. The second piece also has a locking flange that is configured to align with and releasably connect with the locking flange of the first piece. The two locking flanges can be held together with a retainer. Upon an impact to the vehicle, the vehicle grille is configured in such a manner that the first and second pieces will break away from each other and move with respect to one another in order to absorb impacts.

7 Claims, 2 Drawing Sheets

BREAK AWAY GRILLE

FIELD OF THE INVENTION

The present invention relates to a two-piece vehicle grille where the two pieces are configured to break away from each other upon the event of a collision.

BACKGROUND OF THE INVENTION

Historically front grilles for automotive vehicles have always been a one-piece member mounted at the front of the engine. One of the inherent problems with vehicle grilles is that during front impacts, even low speed front impacts the grille can be damaged and have to be replaced. Thus, the entire single piece grille would have to be discarded and a new one installed. This can be tremendously costly to the consumer and wasteful from a material standpoint.

SUMMARY OF THE INVENTION

The present invention is directed to a break away vehicle grille having a first piece with a locking flange and a second piece located generally adjacent the first piece. The second piece also has a locking flange that is configured to align with and releasably connect with a locking flange of the first piece. The two locking flanges can be held together with a retainer, such as a spring clip. Upon an impact to the vehicle grille the spring clip can break or become disengaged and the two locking flanges will unlock as the second piece slides with respect to the first piece. This design allows for the two-piece grille design to absorb impact which would otherwise destroy the entire grille structure. For example, in some instances only the spring clip will break and no damage will occur to the first or the second piece. Thus, keeping the entire grille from having to be replaced. In other instances upon impact the second piece will slide with respect to the first piece so that just the second piece will become damaged and have to be replaced without having to replace the first piece. Such a grille design will reduce the time involved in repairing the vehicle since the entire grille will not have to be replaced. Furthermore, materials will be saved since only a portion of the vehicle grille will need to be repaired and lastly in instances where no damage occurs to the first or second piece upon a collision, only the spring clip will have to be replaced thus saving both sections of the vehicle grille.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1:
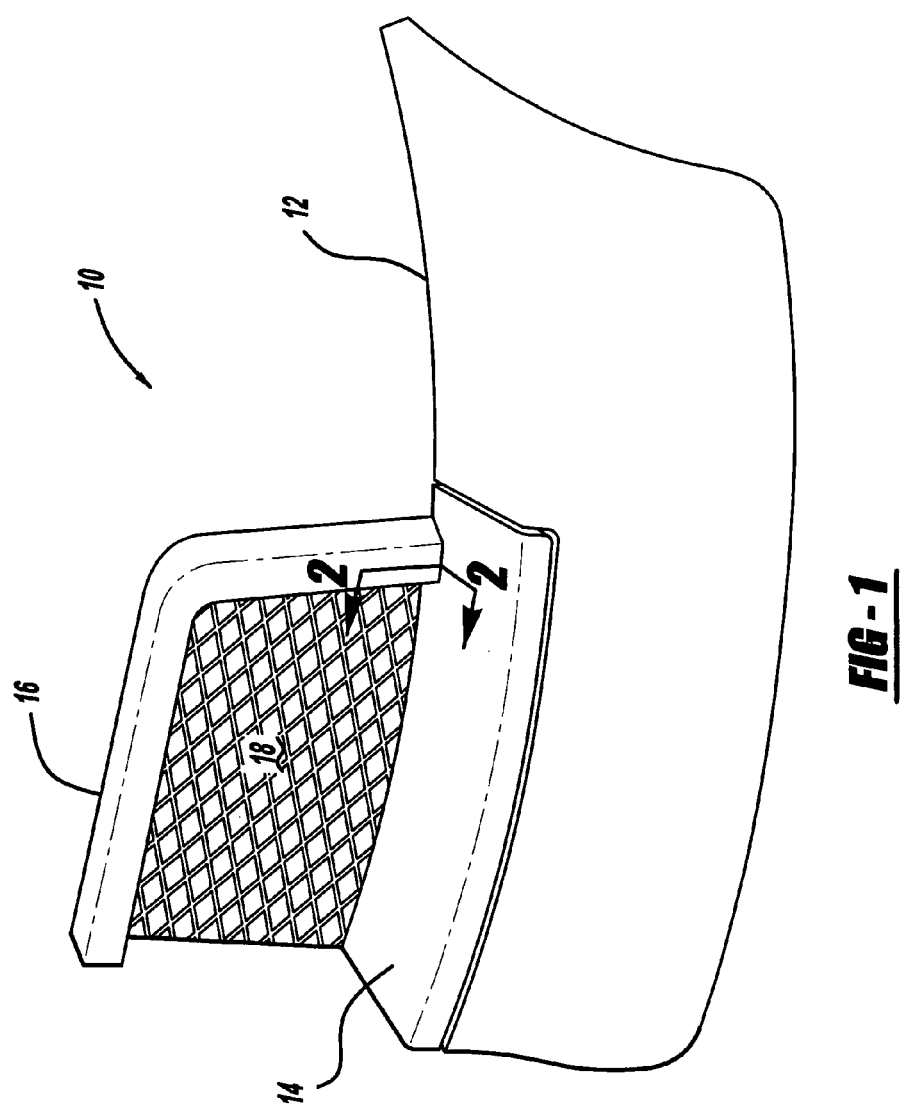
FIG. 1 is a perspective view of half of a bumper fascia with a two-piece break away vehicle grille attached.

Referring to FIG. 1 a perspective view of a break away vehicle grille 10 in accordance with the present invention is shown mounted on a bumper fascia 12. The vehicle grille 10 has a lower portion 14 or second piece that is positioned generally adjacent the bumper fascia 12. An upper portion 16 or first piece extends at a generally perpendicular angle and is positioned adjacent to the lower portion 14 so as to look like a continuous single piece vehicle grille 10. The upper portion 16 has a grille texture surface 18 that can take any shape or form. The upper portion 16 and lower portion 14 can also take virtually any type of shape or form depending on the desired overall design of the vehicle grille 10.

Figure 2:
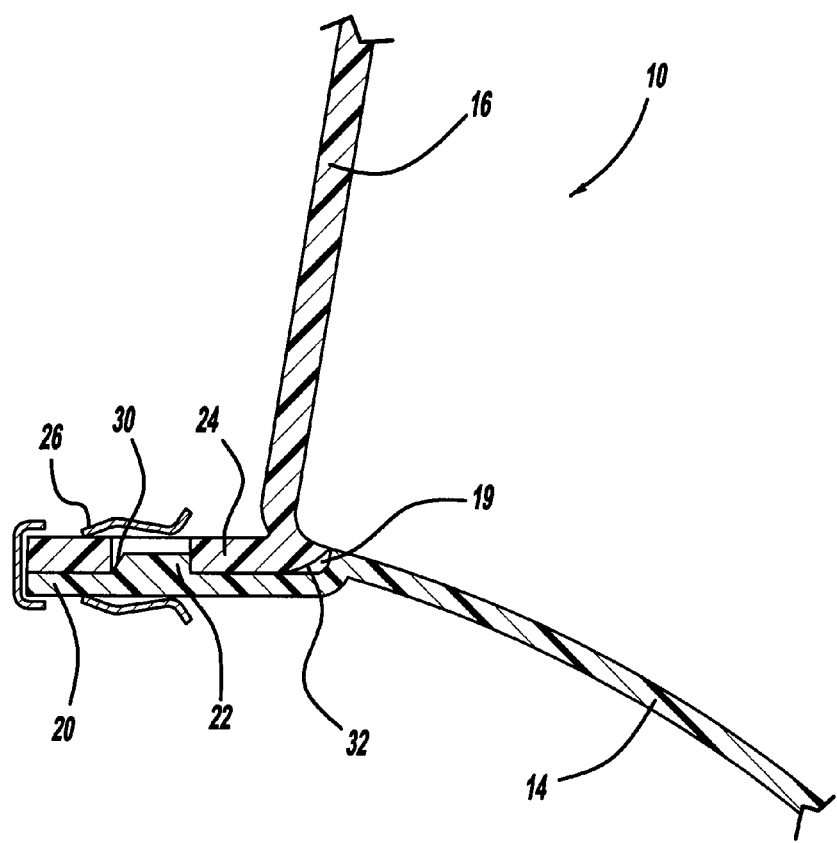
FIG. 2 is a plan cross-sectional view taken about section line 2-2 of FIG. 1.

Referring now to FIG. 2 a sectional plan view of the vehicle grille 10 is shown as taken about section line 2-2 of FIG. 1. The lower portion 14 is depicted in this particular view as having an arcuate shape, however, it is within the scope of this invention for the lower portion 14 to have virtually any type of shape depending on the particular application. In order to make the grille 10 look continuous the lower portion has a recess 19 for receiving the upper portion 16.

The lower portion 14 has a locking flange 20 that extends behind the portion of a vehicle grille 10 that is viewed from the outside of the vehicle. The locking flange 20 is configured to mate with a locking flange 24 of the upper portion 16. The locking flange 20 of the lower portion 14 has a tab 22 that is configured to align with a recess formed in the locking flange 24 of the upper portion 16. A retainer 26, which can take many forms such as a spring clip, C-clip, alligator clip or a break away fastener is used hold together the locking flanges 20, 24 of the lower portion 14 and upper portion 16.

In the event of a collision at the region of the bumper fascia 12 shown in FIG. 1 the lower portion 14 of the vehicle grille 10 will be the first portion of the vehicle grille 10 to shift. However, if the impact is minimally intrusive, that is if an object does not contact the upper portion 16 or grille texture surface 18 then the vehicle grille 10 is configured to allow the lower portion 14 to break away from the upper portion 16. If such an impact occurs the lower portion 14 will slide to the left, as viewed in FIG. 2, which will cause the lower portion 14 to come into contact with a ramped surface 32 located on the upper portion 16. The ramped surface 32 allows the lower portion to slide past the upper portion 16. Additionally, the tab 22 on the locking flange 20 of the lower portion 14 has ramped surface 30 that also facilitates the sliding of the lower portion 14 with respect to the upper portion 16. The ramped surface 30 will facilitate the movement of the locking flange 20 of the lower portion 14 past the locking flange 24 of the upper portion 16. Additionally, the ramp 30 also aids in breaking the retainer 26 that holds the flanges 20, 24 together.

With respect to the use of locking flanges 20 and 24 it should be noted that FIG. 2 only shows a single pair of locking flanges. However, it is within the scope of this invention to provide any number of locking flanges necessary to retain the upper and lower portions of the grille. For example a greater number of locking flanges may be necessary for large vehicle grilles, such as those found on semi-trucks or other commercial style vehicles, or a lesser number of locking flanges may be needed for smaller vehicles. Therefore it is within the scope of this invention to provide any number of locking flanges and retainers required for a particular application.

It is also within the scope of this invention to have a greater or lesser number of ramped surfaces on the upper and lower portion. For example, it may not be completely necessary to have the ramped surface 30 on the tab 22 of the lower portion 14 for every application. Also, it is possible to have a ramped surfaced on the lower portion 14, without having a ramped surface on the upper portion 16. In certain applications it may further be desirable to have two ramped surfaces one on the upper portion 16 and one on the lower portion 14. All of these different variations will depend on the configuration or overall design of the vehicle grille.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A break away vehicle grille assembly comprising:
   a lower portion of said vehicle grille;
   an upper portion positioned partially adjacent to and extending generally perpendicular to said lower portion;
   a vehicle grille texture surface connected to said upper portion and said vehicle grille texture surface located adjacent said lower portion;
   at least one pair of locking flanges releasably connected together, wherein a first locking flange of said pair of locking flanges extends from said upper portion and a second locking flange of said pair of locking flanges extends from said lower portion; and
   a retainer for releaseably securing said first locking flange and said second locking flange.

2. The vehicle grille of claim 1 wherein said retainer is one selected from a group comprising a spring clip, C-clip, alligator clip or a break away fastener.

3. The vehicle grille of claim 1 wherein the upper portion has a ramped surface located adjacent said lower portion.

4. The vehicle grille of claim 3 wherein said lower portion has a ramped surface adjacent said upper portion.

5. The vehicle grille of claim 1 wherein said lower portion has a ramped surface adjacent said upper portion.

6. The vehicle grille of claim 1 further comprising a tab located on said locking flange of said lower, wherein said tab is configured to be positioned within a recess formed in said locking flange of said upper portion.

7. The vehicle grill of claim 6 wherein said tab has a ramped surface for facilitating the sliding of said tab out of said recess.

* * * * *